United States Patent [19]

Rebers et al.

[11] Patent Number: 4,778,368
[45] Date of Patent: Oct. 18, 1988

[54] DEVICE FOR THE PRODUCTION OF BOOTS HAVING PORTIONS OF DIFFERENT COLORS

[75] Inventors: Günter Rebers, Achim; Klaus-Jürgen Zierott, Achim-Bierden, both of Fed. Rep. of Germany

[73] Assignee: Klöckner Ferromatik Desma GmbH, Malterdingen, Fed. Rep. of Germany

[21] Appl. No.: 37,681

[22] Filed: Apr. 13, 1987

[30] Foreign Application Priority Data

Apr. 11, 1986 [DE] Fed. Rep. of Germany ....... 3612255

[51] Int. Cl.⁴ ............................................. B29C 45/16
[52] U.S. Cl. ................................. 425/119; 264/328.8; 425/120; 425/129.2; 425/130; 425/183; 425/190; 425/577; 425/DIG. 5
[58] Field of Search ...................... 425/119, 129 S, 183, 425/185, 190, 191, 192 R, 130, 577, 120, DIG. 5; 264/328.8

[56] References Cited

U.S. PATENT DOCUMENTS

| | | | |
|---|---|---|---|
| 3,302,243 | 2/1967 | Ludwig | 425/129 S |
| 3,343,223 | 9/1967 | Ludwig | 425/119 |
| 3,400,429 | 9/1968 | Ludwig | 425/119 |
| 3,608,004 | 9/1971 | Borisuck | 425/119 |
| 3,915,608 | 10/1975 | Hujik | 425/129 S |
| 4,149,696 | 4/1979 | Koch et al. | 425/129 S |

Primary Examiner—Jay H. Woo
Assistant Examiner—James C. Housel
Attorney, Agent, or Firm—Watson, Cole, Grindle & Watson

[57] ABSTRACT

A device including an injection mold for the production of a boot from thermoplastic material, the boot having a boot shank of a color different from that of the shank flange and the outer sole, both of which have the same color, by molding the shank and then in a subsequent and simultaneous step, molding the upper shank flange and the outer sole onto the molded shank. The injection mold includes a last for fitting with a textile sock, a base stemple having a deadhead borehole for injection molding the outer sole, another base stemple having a deadhead borehole for molding the shank, and two sidepieces. The sidepieces having sliding elements and, in their closed position for molding the upper shank flange, accommodate at least one deadhead borehole which communicates with the deadhead borehole of the base stemple for the outer sole. The sliding elements cover the cavity for the upper shaft flange during the molding of the shaft and release it for the molding of the upper shank flange.

14 Claims, 7 Drawing Sheets

DEVICE FOR THE PRODUCTION OF BOOTS HAVING PORTIONS OF DIFFERENT COLORS

The present invention relates generally to a device for the production of boots from thermoplastic material, and more specifically to a device for the production of boots where the shaft of the boot has a color different from that of the shaft flange and the outer sole.

BACKGROUND OF THE INVENTION

In the production of two-tone or two-color boots from thermoplastic material, devices are used which include injection mold forms which each has two base stamps, a last and two shaped lateral form pieces. The lateral form pieces, when in their closed position with the last centered therebetween, provide a cavity in which a boot shaft is molded. A base stamp for forming the shaft base when in its closed position is adjacent to the cavity to the shaft base supporting the subsequently form the boot shaft for the outer sole.

After a textile sock (a feed-stock made of woven material) is fitted on the last, the lateral form pices are pivoted towards the last and the base stamp for forming the shaft base is pivoted and fit against the two lateral form pieces. By means of a deadhead borehole in the base stamp, material is injected into the cavity for the purpose of forming the shaft and the shaft base.

After the shaft material solidifies, the base stamp for forming the shaft base is pivoted away from the lateral form pieces and a base stamp for forming the outer sole is then pivoted against the two lateral form pieces. Thereafter, material for forming the outer sole is injected through a deadhead borehole in this base stamp into the space defined by the lateral form pieces in their closed position, by the base stamp for forming the outer sole, and by the already-molded shaft base on the last.

Generally, the production of boots from thermoplastic material can be accomplished in this fashion, particularly when the outer sole consists of a material of some color other than that of the shaft.

Difficulties arise, however, when the upper shaft flange is to be of a material of some color other than that for the shaft. In principle, it could be done such that after the molding of the shaft and molding-on of the sole, the shaft on the last with the molded sole is brought into another work station in which, with appropriate tool parts, the upper shaft flange is molded from material of the corresponding color. Experience has shown that a clear dividing line between the differently-colored upper shaft flange and the shaft cannot generally be produced. In addition, this finishing process is very time-consuming.

SUMMARY OF THE INVENTION

The subject invention includes the recognition that if the upper shaft flange and the outer sole are of the same color, considerable time-savings occurs if both the upper shaft flange and the outer sole are molded onto the shaft in one molding cycle. Thus, the invention relates to a device for producing boots from thermoplastic material where the boot shaft is of a color different from that of the shaft flange and the outer sole, both of which have the same color, by molding the outer sole and the upper shaft flange onto the shaft in one molding cycle. More specifically, the device allows for molding of the shaft and then the subsequent simultaneous molding of the upper shaft flange and of the outer sole onto the molded shaft by providing a last for fitting of a textile sock, a base stamp having a deadhead borehole for molding the outer sole, a base stamp having a deadhead borehole for molding the shaft, and two sidepieces having sliding elements pivotable on the last. The sidepieces which in their closed position are for molding the upper shaft flange accommodate at least one deadhead borehole which communicates with a deadhead borehole of the base stamp. During the molding of the shaft, the sliding elements cover the cavity for the upper shaft flange and then release for molding the upper shaft flange. By molding the upper shaft flange and the outer sole in one molding cycle, boots are made with an upper shaft flange and an outer sole made of the same material, and of the same color and/or the same shade of color. Since the device is not opened after molding of the shaft, a precisely delineated dividing line is achieved between the upper shaft flange and the boot shaft in the process of molding the upper shaft flange and the outer sole. During the first molding cycle, i.e., during the molding of the shaft, the cavity of the device for molding the upper shaft flange is covered and/or filled out by means of the sliding elements. The device then works in cooperation with the base stamp in molding the shaft base in a manner that, in the first molding cycle, the shaft and the shaft base are molded, and finally, in the second molding cycle, the lateral form pieces work in cooperation with the base stamp in molding the outer sole. The outer sole and the upper shaft flange are simultaneously molded by the sliding elements changing position to define the cavity to mold the upper shaft flange and the deadhead borehole of the base stamp is in communication with the deadhead borehole of the sidepieces in the molding of the outer sole.

According to a preferred embodiment of the invention, the sliding elements comprise two slidable cover elements with an attached switching rod defining the cavity of the shaft flange, two wedge elements leading into the sidepieces and controlled by the base stamps and two form elements for the upper shaft flange led by the lateral form pieces and working together with the wedge elements and the cover elements. During molding of the shaft and the shank base, the cavity for molding the shaft flange is covered and/or filled out by the sliding elements being in appropriate positions. After replacing the base stamp for the molding of the shaft base with the base stamps for molding the outer sole and after the formation of the cavity for the molding of the upper shaft flange, molding of the upper shaft flange and of the outer sole is conducted simultaneously.

To maintain the sliding elements in their respective positions, in one embodiment of the invention, the sidepieces each have a steering pin with a pressure spring, the steering pins being connected with the wedge elements. The steering pins work in cooperation with the base stamp for the outer sole, and the base stamp for the shaft base such that the sliding elements cover the cavity for the upper shaft flange during the first molding cycle and uncover it during the second molding cycle.

In yet a further embodiment of the invention, the switching rod for the cover elements is led into a locking device for the last which is controlled dependent upon the position of the sliding elements and/or controlled together with them.

In yet a further embodiment of the invention, the wedge surface of the wedge elements has a stage for the creation of a resting position for the form elements during the molding of the shaft and for the creation of an operating position for the molding of the shaft flange.

In yet another embodiment of the invention, pressure springs are provided between the wedge elements and the sides of the form elements formed as wedge surfaces pointing to the wedge elements, so that in the appropriate position of the wedge elements the form elements are brought into a resting position by means of the springs.

In still another embodiment of the invention for the creation of an overlap zone in the area of the shaft and the ridge of the shaft of the molded boot, the cover elements have a bevel.

BRIEF DESCRIPTION OF THE DRAWINGS

In the drawings,

FIG. 3e is a cross-sectional view of another stamp used with the sidepieces of FIGS. 3a and 3d.

DETAILED DESCRIPTION OF THE PREFERRED EMBODIMENTS

Figure 1A:
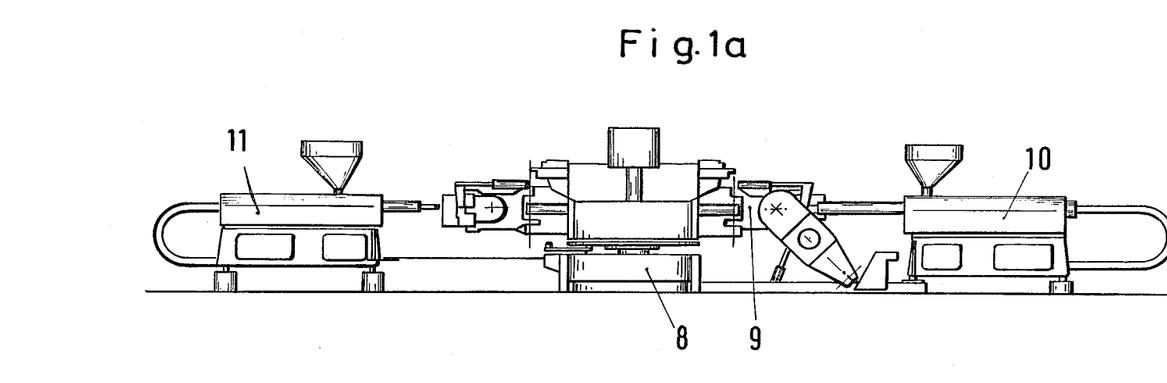
FIG. 1a is an overall view of a device with working stations and injection molding devices for the production of boots whose shaft flange and outer sole have the same color.

FIG. 1a shows a side view of a device 8 for producing two-color boots, the device operating according to the principle of a rotary table system. Device 8 includes a rotary table having a plurality of built-in work stations 9, of which only two are shown, which cooperate with injection molding devices 10 and 11 for providing different colors and materials.

Figure 1B:
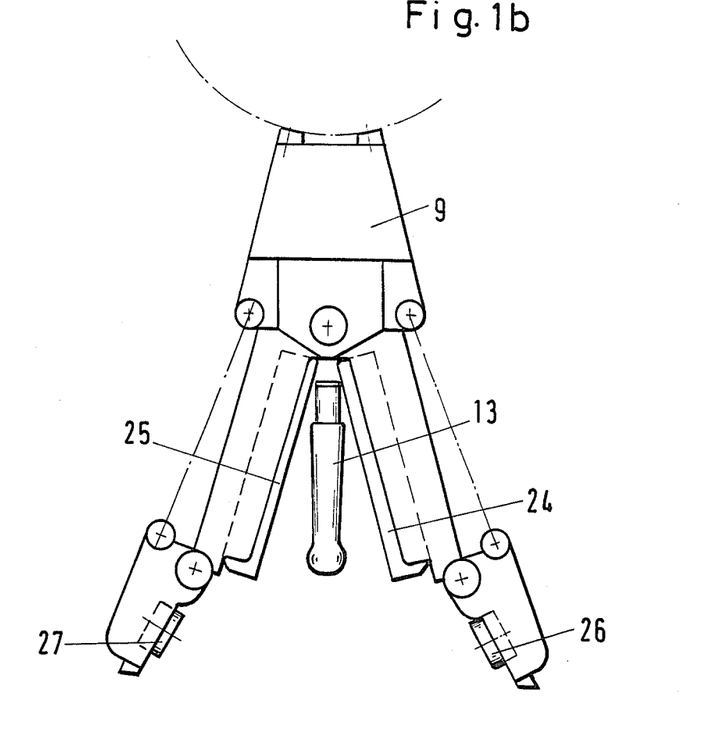
FIG. 1b is a detailed view of a working station of FIG. 1a, FIG. 2 is a view in perspective of a last with cover elements.
Figure 2:
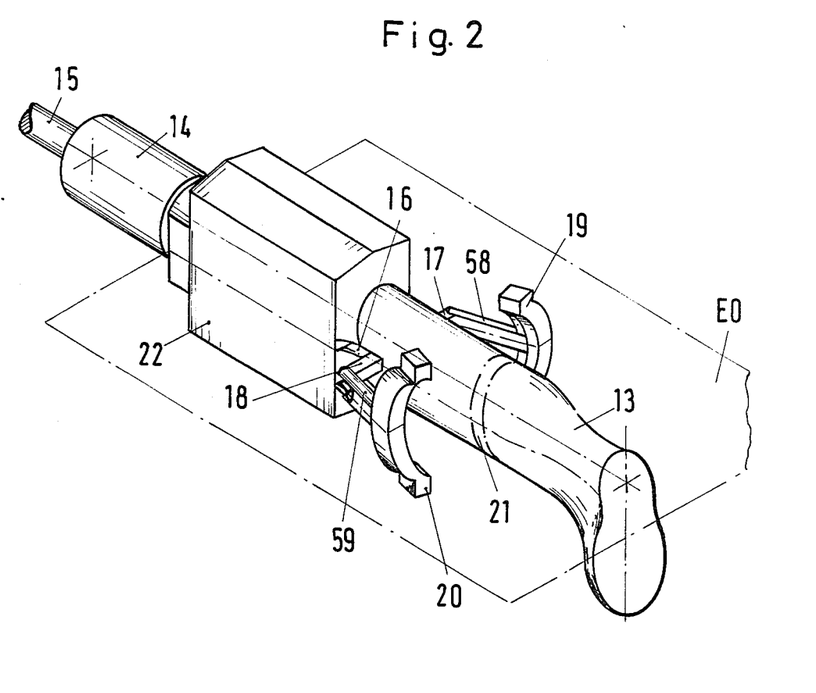
Figures 3A, 3C:
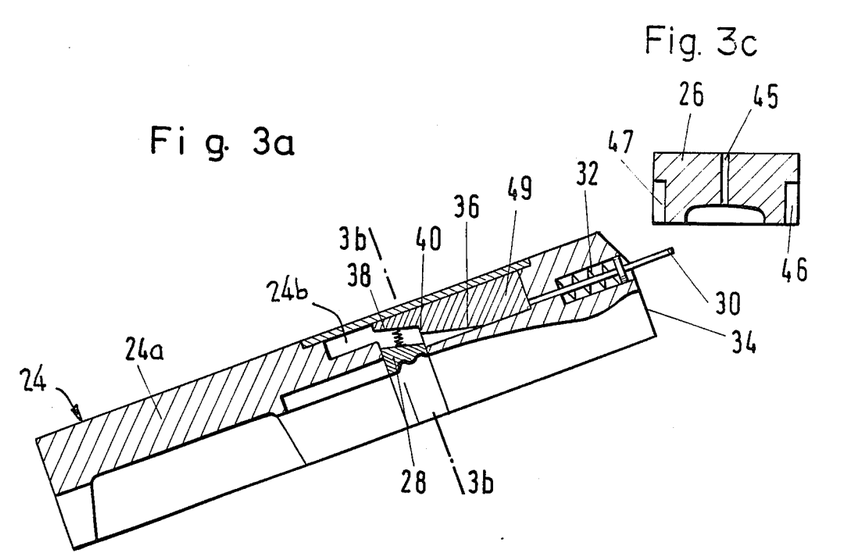
FIG. 3a is a cross-sectional view of a sidepiece for the device of FIG. 1a, FIG. 3b is a cross-sectional view taken along line 3b of FIG. 3a which shows the shape of the sidepiece and the wedge element.
FIG. 3c is a cross-sectional view of a stamp used with the sidepiece of FIG. 3a, FIG. 3d is a cross-sectional view of a second sidepiece.
Figure 3B:
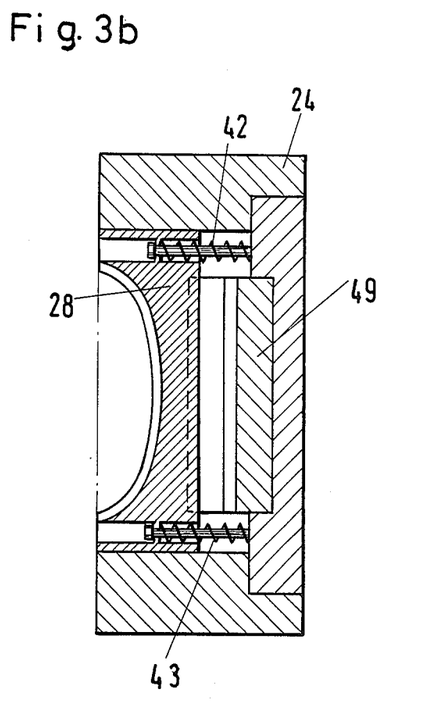
Figures 3D, 3E:
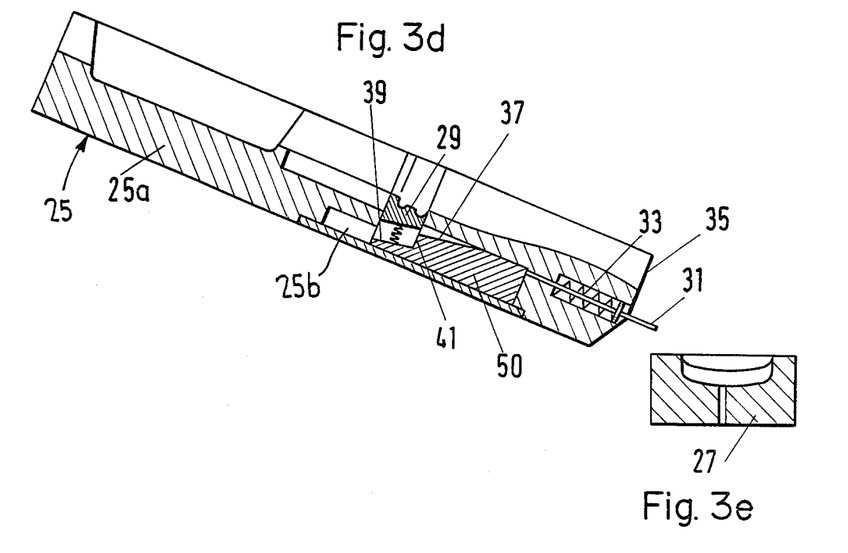

FIG. 1b shows a plan view of a work station 9 in an open condition illustrating the components of the injection mold, i.e., last 13 (see also FIG. 2), sidepieces 24 and 25 (see also FIGS. 3a and 3d) and base stamps 26 and 27 (see also FIGS. 3c and 3e).

FIG. 2 is a perspective view of last 13 with associated cover elements 19 and 20. Last 13 is joined to last mounting 14 by means of a coupling (not shown). Last mounting 14 supports an axially slidable switching rod 15, which on the end nearest to last 13 has two round cross sections 17 and 18 run through by way of slittings 16, onto which are linked cover elements 19 and 20 via arms 58 and 59. In their closed positions, cover elements 19 and 20 contact shaft zone 21 of last 13. In addition, the mounting for last 13 includes a prismatic (centering) body 22 on its axis, the prismatic body serving to center the sidepieces (not shown). When producing a boot, a lining consisting of a woven material formed like a stocking (not shown) is first fitted to last 13.

FIGS. 3a, 3d, 3c and 3e respectively show a cross-section through sidepiece 24, sidepiece 25, base stamp 26 and base stamp 27 as taken through the plane labeled with EO in FIG. 2. Base stamp 26 is for forming the shaft base and base stamp 27 is for forming the outer sole. As sliding elements, sidepieces 24 and 25 include elongated main elements 24a and 25a which provide elongated cavities 24b and 25b, wedge elements 49 and 50 and form elements 28 and 29, which are formed in complementary fashion, on their respective sides pointing to the shaft (not represented), on the shank flange onto which molding is to take place. Wedge elements 49 and 50 are each connected with steering pins 30 and 31, respectively, each of which is supported within the assigned sidepiece. The steering pins 30 and 31 are biased by pressure springs 32 and 33, respectively, and are mounted in the sidepieces so as to extend away from the front ends 34 and 35. Wedge element 49 provides essentially parallel wedge surfaces 36 and 38 which are offset from each other. In a like fashion, wedge element 50 includes wedge surfaces 37 and 39. Because of the boot heel 40 and 41, the two wedge surfaces are set to each other by degrees. Wedge elements 49 and 50 each can slide in the direction of the axis of their respective steering pins 30 and 31 along the longitudinal direction of the sidepieces. Base stamp 26 for molding the shank base has a deadhead borehole 45, as well as recesses 46 and 47. During the first molding cycle, recesses 46 and 47 take up steering pins 30 and 31 and press against them with their front ends.

FIG. 3b shows a cross-section taken vertically to the drawing plane of FIG. 3a, which section extends through form element 28 in sidepiece 24 and wedge element 49. Sidepiece 25 has the same construction although in symmetry. Form elements 28 and 29 are slidable vertically to the direction of movement of the wedge elements and are biased into their working position by pressure springs 42 and 43, respectively.

Figures 4A, 4B:
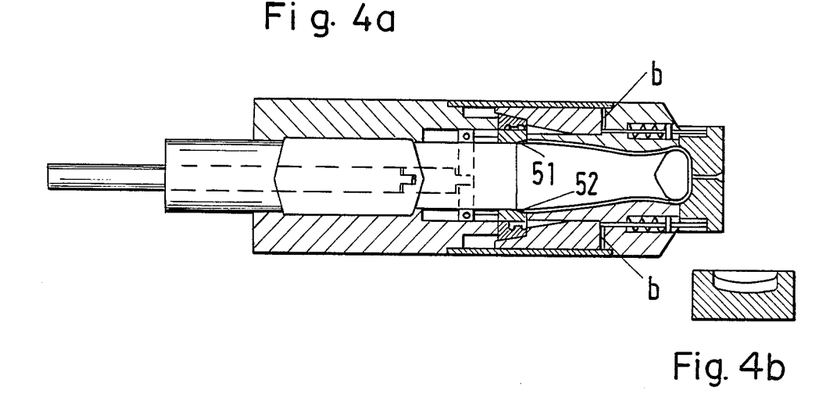
FIG. 4a is a cross-sectional view according to FIG. 1a, where a portion of the mold is in the working position for the first molding cycle.
FIG. 4b is a cross-sectional view of a base stemple.

FIG. 4 shows in an illustration corresponding to FIG. 3, a cross-section through the mold during molding of the boot shank.

In operation of the device of the subject invention, after a lining or stocking is first fitted onto last 13 (see FIG. 2), sidepieces 24 and 25 are pivoted from their open position over onto the last and at the same time cover elements 19 and 20 contact shaft zone 21 on the last. Simultaneously, the force of the springs 42 and 43 causes form elements 28 and 29 to be pressed against wedge surfaces 38 and 39, respectively, both standing together against the cover elements. Once the sidepieces 24 and 25 are pivoted onto last 13, base stamp 26 is swung over against the front ends 34 and 35 of the sidepieces and locked on with means not shown. During this pivoting or swinging action of the base stamp 26, the steering pins 30 and 31 are pushed inwardly of the front ends 34 and 35 and the wedge elements 49 and 50 are moved along the cavities 24b and 25b such that the wedge surfaces 38 and 39 of the wedge elements 49 and 50 will press the form elements against the cover elements 19 and 20 and lock them against the a locking of cover elements 19 and last 13. This slight shifting of the wedge elements is represented schematically by the opening b of FIG. 4a. In the area of their ridge, the cover elements 19 and 20 have a chamfering 51 and 52 on their side pointing to the shaft, so that in the direction toward the last mounting runs in tapered fashion, the cavity formed by the last, the sidepieces, the base stamp 26 and the cover elements for the injection of the material for the shaft and the shaft base in the direction toward the last mounting. The material is injected by way of the deadhead borehole 45 for the shaft and the shaft base.

Figure 5:
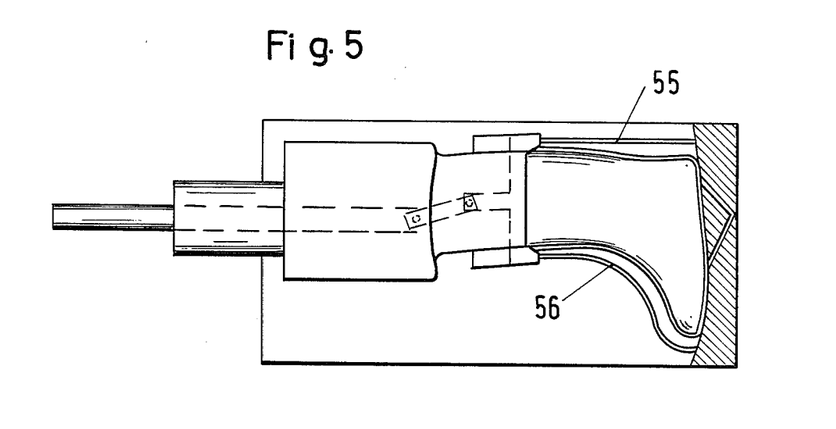
FIG. 5 is a cross-section of FIG. 4, vertical to its drawing plane, where the sectional plane is shifted into the tangential plane of the sidepieces.

FIG. 5 is a cross-sectional view vertical to the plane of FIG. 4. In FIG. 5, the sidepieces define in their closed position in an essentially known fashion, deadhead boreholes 55 and 56, which, during the first molding cycle are closed on one end by base stamp 26, and, on the other end, by means of the cover elements.

Figures 6A, 6B:
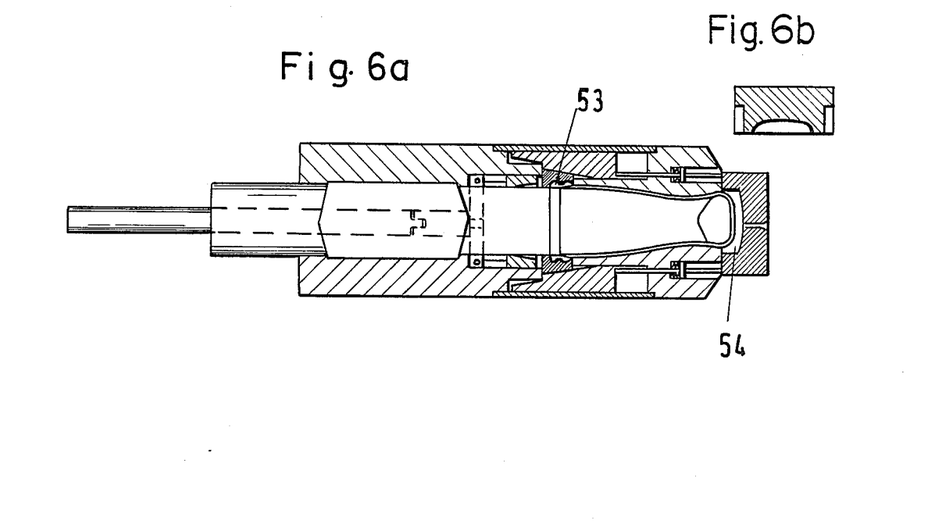
FIG. 6a is a cross-sectional view of device of FIG. 1a, where the device is in the working position for the second molding cycle.
FIG. 6b is a cross-sectional view of a stamp.

After the shaft and the shaft base solidifies, base stamp 26 is pivoted such that it comes free from the two sidepieces. Steering pins 30 and 31 then occupy their positions as shown in FIG. 3a, and release the locking of the form elements 28 and 29. By means of the switching rod 15, cover elements 19 and 20 can be shifted into their position as shown in FIG. 6a. Subsequently, base stamp 27 for forming the outer sole is pivoted over onto front ends 34 and 35 of the sidepieces 24 and 25. In this manner, the steering pins are loaded and the wedge elements are shifted into the position as shown in FIG. 6a. The form elements 28 and 29 thereby come into contact with wedge surfaces 36 and 37 and become pressed onto the last, forming a cavity 53 for the production of the shaft flange. After the pivoting action of base stamp 27 onto the sidepieces, cavity 54 is formed simultaneously for the molding of the outer sole onto the shaft base. From FIG. 6a it can be seen that because of the staggered rim of the cover elements, the shaft slowly tapers off in the region of the upper flange and the shaft zone of the last overlaps.

Figure 7:
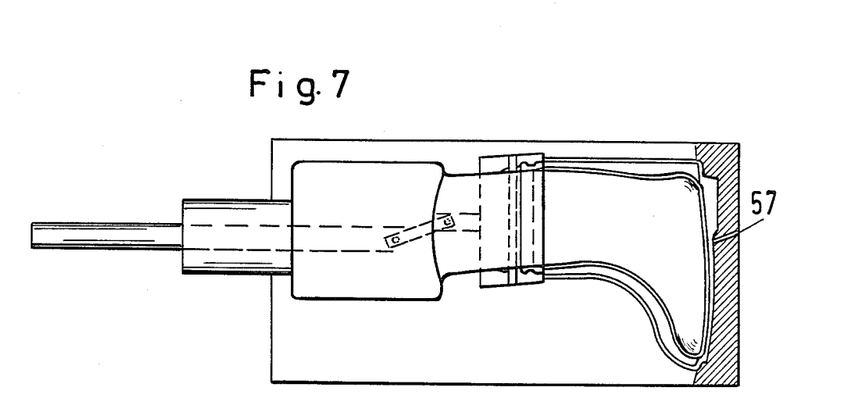
FIG. 7 is a cross-sectional view of FIG. 6, vertical to its drawing plane, where the sectional plane is shifted into the tangential plane of the two sidepieces.

FIG. 7 shows a cross-sectional view vertical to the drawing plane of FIG. 6a. In FIG. 7 the position of the components of the mold during the second molding cycle are shown where the deadhead canals 55 and communicate between cavity 53 and cavity 54. The material for forming the outer sole and the shank flange is injected by way of deadhead borehole 57 in base stamp 27. In this manner an overlap area is formed, as is shown in FIG. 7, between the upper shaft flange and the tapering-off flange of the shaft. After the material for the shaft flange and the outer sole solidifies, base stamp 27 is pivoted such that it comes free of the sidepieces and the sidepieces are pivoted into an open position as is shown in FIGS. 3a and 3d. Subsequently, the finished boot is removed from the last and then the last is fitted with a lining for the first molding step of the next molding cycle.

In summary, with a mold according to the invention the production time for a boot whose upper shaft flange and outer sole consist of a material of identical composition and color, which is different from the material of the shaft, can be significantly shortened. Furthermore, the cross-over areas between the zones of different colors in the boot are precisely delineated, i.e., there is a clear color dividing line.

What is claimed:

1. An injection molding apparatus for producing a boot having a shaft and a shaft base molded from a first composition and a shaft flange and an outer sole molded from a second composition, said injection molding apparatus including
   a last on which a textile sock can be positioned and on which said first and second compositions can be molded, said last having a side surface and a bottom surface and defining a center line therethrough,
   two cover elements which are located on opposite sides of said last and are both pivotable towards and away from the side surface of said last and movable in parallel with said center line from a first position near said bottom surface to a second position away from said bottom surface,
   two sidepieces which are pivotable towards and away from the side surface of said last, each sidepiece including
      an elongated main element which includes an elongated cavity therein and which defines an inner surface facing the side surface of said last and an end surface which, when the sidepiece is pivoted to its closest position relative to the side surface of said last, is located near the bottom surface of said last, said inner surface having an opening therein which communicates with said elongated cavity, said opening being located so as to be in register with an associated cover element when the sidepiece is pivoted to its closest position relative to the side surface of said las and said associated cover element is in its first position,
      a form element which is located in said opening and is movable back and forth relative to said inner surface, said form element having a contoured inner surface which can abut an associated cover element when in its first position and can provide a first mold cavity for a shaft flange of a boot when said associated cover element is in its second position,
      a wedge element which is located in said elongated cavity and movable therein to lock said form element in position,
      said elongated main element including at least one injection canal communicating between the end surface thereof and said first mold cavity, and
   first and second base stamps which are separately positionable against the end surfaces of said elongated main elements when said sidepieces are pivoted to their closest positions relative to said last, said first base stamp providing a second mold chamber which surrounds the bottom surface of said last but does not communicate with any injection canals in said elongated main elements, so that when a first composition is supplied thereto said first composition will fill the second mold cavity and will flow around the side surface of said last up to said cover elements to mold a shaft and shaft base of a boot on said last; and said second base stamp providing a third mold cavity which surrounds the bottom surface of said last and communicates with each injection canal in said elongated main elements, so that when a second composition is supplied thereto said second composition will fill the third mold cavity and said first mold cavity to mold an outer sole on said shaft base and a shaft flange on said shaft.

2. An injection molding apparatus according to claim 1, wherein each elongated main element of each sidepiece includes a channel which extends from the elongated cavity therein to the end surface thereof, and including a steering pin which extends from the wedge element in each elongated cavity and through the channel in the associated elongated main element to extend beyond the end surface thereof, movement of either said first base stamp or said second base stamp against the end surfaces of said elongated main elements of said two side pieces causing said steering pin to move said wedge elements along the elongated cavities in which they are movably located and coact with the associated form elements to lock said form elements in position.

3. An injection molding cavity according to claim 2, including a pressure spring associated with each steering pin to bias the steering pin such that the attached wedge element is moved out of locking engagement with the associated form element.

4. An injection molding apparatus according to claim 2, including a pair of springs which extend from each elongated main element to each form element to bias said form element outwardly of the opening in the elongated main element in which it is movable.

5. An injection molding apparatus according to claim 2, wherein each said cover element has a surface which can contact the side of said last, each said surface being chamfered outwardly in the direction of the bottom surface of said last.

6. An injection molding apparatus according to claim 2, including a centering body on which said last is mounted and a switching rod which extends through said centering body and to which said cover elements are pivotally attached, axial movement of said switching rod with respect to said centering body causing said cover elements to move from said first to said second positions.

7. An injection molding apparatus according to claim 1, wherein said first and second base stamps are respectively pivotally connected to said elongated main elements of said two sidepieces.

8. An injection molding apparatus for producing a boot having a shaft and a shaft base made of a thermoplastic material having a first color and a shaft flange and an outer sole made of a thermoplastic material having a second color, said injection molding apparatus comprising a last on which a textile sock can be positioned; a first base stamp having an injection borehole therethrough; a second base stamp having an injection borehole therethrough; two sidepieces which are pivotally movable toward and away from opposite sides of said last, said sidepieces being cooperable with said first base stamp to enable a shaft and a shaft base of a boot to be simultaneously molded on said last, each sidepiece including an opening for the molding of a shaft flange and an injection canal which can communicate between said opening and the borehole in said second base stamp, said sidepieces and said second base stamp being cooperable to simultaneously enable a shaft flange to be molded onto a previously-molded shaft and an outer sole to be molded onto a previously-molded shaft base; and two cover elements which are slidingly movable relative to said last to cover said openings in said sidepieces when a shaft and a shaft base are being simultaneously molded onto said last and uncover said openings when a shaft flange and an outer sole are being respectively simultaneously molded onto a previously-molded shaft and a previously-molded shaft base.

9. An injection molding apparatus according to claim 8, including a switching rod which is movable relative to said last, wherein said cover elements are pivotally connected to said switching rod so as to be slidingly and pivotally movable relative to said last, wherein said sidepieces include form elements which are movable relative to the openings therein to mold said shaft flange, and wherein said sidepieces include wedge elements which can cooperate with said form elements to lock said form elements in position when molding a shaft flange.

10. An injection molding apparatus according to claim 9, wherein said switching rod extends into said last.

11. An injection molding apparatus according to claim 9, wherein said sidepieces include steering pins for controlling the positioning of the wedge elements therein, and pressure springs to bias said steering pins such that said wedge elements are biased out of locking engagement with said form elements.

12. An injection molding apparatus according to claim 9, including pressure springs extending between said form elements and said sidepieces to bias said form elements into a molding position.

13. An injection molding apparatus according to claim 9, wherein said cover elements are chamfered.

14. An injection molding apparatus according to claim 9, including a prismatic centering body on which said last is mounted and wherein said sidepieces respectively abut against opposite sides of said prismatic centering body when moved towards said last.

* * * * *